US005132881A

United States Patent [19]

Wakimizu et al.

[11] Patent Number: 5,132,881
[45] Date of Patent: Jul. 21, 1992

[54] VEHICULAR HEADLAMP OF THE PROJECTION TYPE

[75] Inventors: Yukio Wakimizu; Saburo Watanabe; Masami Handa; Hirohiko Ohshio, all of Shizuoka, Japan

[73] Assignee: Koito Manufacturing Co., Ltd., Tokyo, Japan

[21] Appl. No.: 753,453

[22] Filed: Aug. 30, 1991

[30] Foreign Application Priority Data

Aug. 31, 1990 [JP] Japan .............................. 2-228215
Sep. 28, 1990 [JP] Japan .............................. 2-257366

[51] Int. Cl.[5] .............................. B60Q 1/00
[52] U.S. Cl. .............................. 362/61; 362/293
[58] Field of Search .............................. 362/293, 61

[56] References Cited

U.S. PATENT DOCUMENTS 4,922,398 5/1990 Muto .............................. 362/61
4,951,178 8/1990 Shirai et al. .............................. 362/293

*Primary Examiner*—Carroll B. Dority
*Attorney, Agent, or Firm*—Sughrue, Mion, Zinn, Macpeak & Seas

[57] ABSTRACT

The vehicular headlamp of the projection type in which a projection unit is installed within a lamp body, the projection unit including an elliptic reflector, a discharge lamp as a light source disposed at a first focal position of the elliptic reflector, an ultraviolet-rays shield glove for covering the discharge lamp, and a projection lens disposed at a forward location of the elliptic reflector, the projection lens collimating and projecting forward the light reflected from the elliptic reflector. The headlamp is improved in that the ultraviolet-ray shield glove is a tubular member which is opened at the fore end and includes a inner lens, disposed between the discharge lamp and the projection lens, for intercepting the ultraviolet rays.

4 Claims, 9 Drawing Sheets

VEHICULAR HEADLAMP OF THE PROJECTION TYPE

BACKGROUND OF THE INVENTION

1. Field of the Invention

The present invention relates to a vehicular headlamp of the projection type in which light emitted from a light source is reflected by an elliptic reflecting mirror, and a projecting lens collimates and projects forward the reflecting light. More particularly, the present invention relates to a vehicular headlamp of the projection type in which a discharge lamp is used for a light source.

2. Conventional Art

Recently, a discharge lamp has gradually been used for a vehicular headlamp because of its good light emission efficiency and attractive coloring. The discharge lamp disadvantageously generates ultraviolet rays when it emits light, which are harmful to the human body. The synthetic resin parts within the headlamp will degenerate with the ultraviolet rays. To eliminate such a problem, the discharge lamp is covered with a glove to intercept the harmful ultraviolet rays.

Where the discharge lamp with a glove is employed, a conventional headlamp of the type as shown in FIG. 1 does not involve problems as discussed below since, in the headlamp of this type, the rays of light emitted from a light source (discharge lamp bulb 1) are collimated by a parabolic reflector 2, and distributed by steps 5 formed on a lens 4.

However, the conventional headlamp of projection type with a glove as disclosed in coassigned U.S. patent application Ser. No. 681,017 and as shown in FIG. 2 suffers from the problems to be solved. In the headlamp of the projection type, the rays of light emitted from a light source (discharge lamp 1) is focused at a second focal position f of an elliptic reflector 3, and then are collimated and projected through a projection lens 6. As shown in FIG. 3, a hot zone 8 is undesirably divided into two parts. A luminous intensity is insufficient at the central portion 9 as shown in FIG. 3 or the mid portion between the divided hot zones.

The present inventors have found that the above problem arises from the fact that a part λ shown in FIG. 2 of the reflected light from the reflector 3 is intercepted at the fore end of the ultraviolet-rays shield glove 1*a*. On the basis of this fact, we reached the conclusion that the problem could be solved by shaping the glove 1*a* to minimize the interception of the reflected light from the reflector 3.

On the other hand, FIG. 4 is a longitudinal sectional view showing the projection type conventional vehicular headlamp housed within a lamp body 62. A projection unit 61 is disposed within the lamp body 62. A lens holder 65, which holds a reflector 63 with a reflecting surface 63*a*, a discharge lamp 64, and a projection lens 65*a* are assembled into a single unit as the projection unit 61. A ultraviolet-rays shield glove 66, which covers the discharge lamp 64, is mounted to a base 4*a* of the discharge lamp 64.

In the structure, the glove 66 is hermetically closed. Accordingly, temperature within the glove 66 rises, possibly reducing the lifetime of the discharge lamp 64. The light reflected from the reflecting surface 63*a* is intercepted at the fore or top end of the glove 66, adversely influencing the distribution of light (the hot zone becomes dark).

SUMMARY OF THE INVENTION

The present invention has been made in view of the afore-discussed circumstances and has an object to provide a projection type vehicular headlamp employing a discharge lamp as a light source, which provides a hot zone of a proper luminous intensity.

Another object of the present invention is to provide a projection type vehicular headlamp employing a discharge lamp as a light source, which cuts the ultraviolet rays detrimental to human body, and the parts of the headlamp and hence to reduce the lifetime of the discharge lamp, and provides a normal distribution of light to the hot zone.

The above and other objects of the invention can be achieved by a provision of the vehicular headlamp of the projection type in which, according to the invention, a projection unit is installed within a lamp body, the projection unit including an elliptic reflector, a discharge lamp as a light source disposed at a first focal position of the elliptic reflector, an ultraviolet-rays shield glove for covering the discharge lamp, and a projection lens disposed at a forward location of the elliptic reflector, the projection lens collimating and projecting forward the light reflected from the elliptic reflector. The headlamp is improved in that the ultraviolet-ray shield glove is a tubular member which is opened at the fore end and includes an inner lens, disposed between the discharge lamp and the projection lens, for intercepting the ultraviolet rays.

Another aspect of the invention employs a projection type vehicular headlamp in which a projection unit is installed within a lamp body, the projection unit including an elliptic reflector, a discharge lamp as a light source disposed at a first focal position of the elliptic reflector, an ultraviolet-rays shield glove for covering the discharge lamp, and a projection lens disposed at a forward location of the elliptic reflector, the projection lens collimating and projecting forward the rays of reflecting light from the elliptic reflector. The headlamp is improved in that the ultraviolet-ray shield glove is a tubular member, which is opened at the fore end, and a part of the outer surface of the discharge lamp where faces the open end of the glove is covered with an ultraviolet-rays cut film.

The above and other objects can be achieved by a provision of a projection type vehicular headlamp in which a projection unit is installed within a lamp body, the projection unit including an elliptic reflector, a discharge lamp as a light source disposed at a first focal position of the elliptic reflector, and a projection lens disposed at a forward location of the elliptic reflector, the projection lens collimating and projecting forward the light reflected from the elliptic reflector. The headlamp is improved in that an ultraviolet-rays shield glove is provided, which is a tubular member which is opened at the fore end, and an ultraviolet-rays shield filter, fixedly supported by a metal plate spring, is disposed between the discharge lamp and the projection lens, for intercepting the ultraviolet rays.

Further, another aspect of the invention is to provide a projection type vehicular headlamp in which a projection unit is installed within a lamp body, the projection unit including an elliptic reflector, a discharge lamp as a light source disposed at a first focal position of the elliptic reflector, and a projection lens disposed at a forward location of the elliptic reflector, the projection lens collimating and projecting forward the rays of reflecting light from the elliptic reflector. The headlamp is improved in that an ultraviolet rays protecting film is formed on the reflecting surface of the elliptic reflector, and an ultraviolet-rays shield filter, fixedly supported by a metal plate spring, is disposed between the discharge lamp and the projection lens, for intercepting the ultraviolet rays.

With the headlamp thus arranged, the reflected light from the reflecting surface of the elliptic reflector, which is for light distribution to the hot zone, is not intercepted by the ultraviolet-rays shield glove, so that the hot zone has a proper size and a proper luminous intensity. In the headlamp of claim 1, the ultraviolet rays emitted through the opening of the fore end of the glove are intercepted by the inner lens disposed at a forward location of the discharge lamp. In the headlamp of the invention, the ultraviolet rays directed toward the open end of the glove is intercepted by the ultraviolet rays cut film formed on the outer surface of the discharge lamp when the rays are emitted from the discharge lamp.

Further, in the headlamp of another aspect of the invention, the reflected light from the reflecting surface of the elliptic reflector, which is for light distribution to the hot zone, is not intercepted by the ultraviolet-rays shield glove, so that a normal distribution of light to the hot zone is secured.

The ultraviolet rays contained in the light emitted from the discharge lamp are cut when passing through the glove. The ultraviolet rays emitted through the opening of the fore end of the glove are cut by the ultraviolet-rays cut filter disposed between the projection lens and the elliptic reflector.

Through opening of the fore end of the glove, the inside of the glove communicates with the outside.

A thermal stress generated between the filter and the elliptic reflector is absorbed by the metal plate spring for fixedly supporting the filter.

Further, according to another aspect of the headlamp of the invention, the ultraviolet rays that are directed directly from the discharge lamp toward the projection lens or directed toward the lens after reflected by the reflector are filtered out by the ultraviolet-rays cut filter.

The discharge lamp is installed within the reflector, not covered by the glove.

A thermal stress generated between the filter and the elliptic reflector is absorbed by the metal plate spring for fixedly supporting the filter.

With provision of the glove covering the discharge lamp, the elliptic reflector is exposed to the ultraviolet rays, but it is protected against the ultraviolet rays by the ultraviolet rays protecting film.

DESCRIPTION OF THE PREFERRED EMBODIMENTS

Preferred embodiments of the present invention will now be described in detail with reference to the accompanying drawings.

Figure 5:
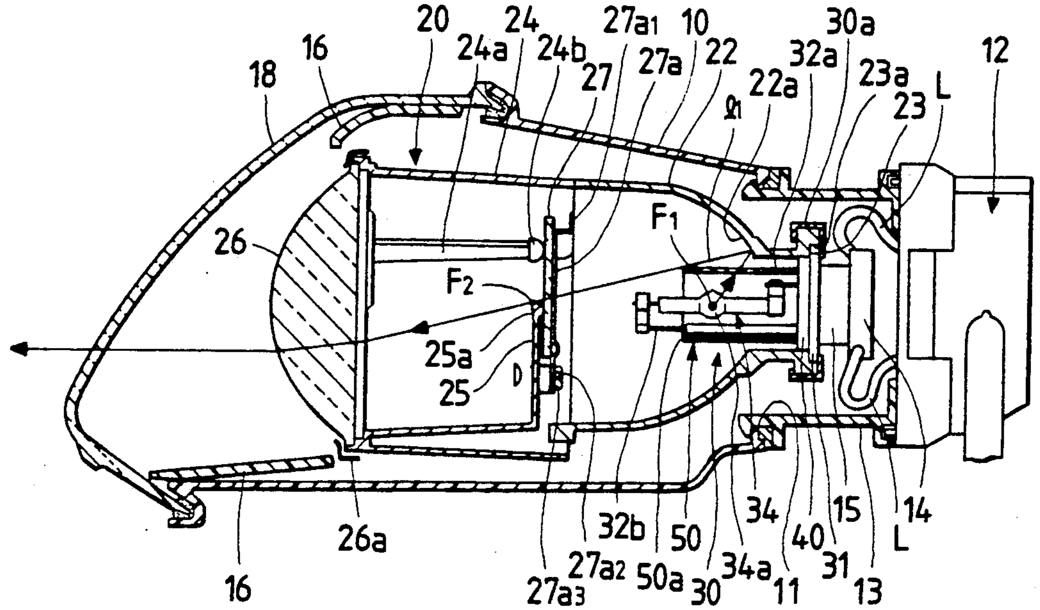
FIG. 5 is longitudinal sectional view showing a vehicular headlamp of the projection type according to an embodiment of the invention.

FIG. 5 is a longitudinal sectional view showing a projection, vehicular headlamp with a discharge lamp as a light source, which is a first embodiment of the invention.

In the figure, reference numeral 10 designates a lamp body shaped like a container. A projection unit 20 is tiltably supported by means of an aiming mechanism (not shown) within the lamp body 10. An elliptic reflector 22 made of metal, a discharge bulb 30 inserted in a bulb hole 23 formed in the rear apex of the reflector, and a metal lens holder 24 fitted in the opening of the fore end of the reflector 22 are assembled into a single unit, or the projection unit 20. Reference numeral *30a* designates a locking cap for fixing the discharge bulb 30 to the bulb hole 23, and *26a* represents a lens fixing frame, shaped like a ring, for fixing a projection lens 26 to the lens holder 24 in a caulking manner.

In the discharge bulb 30, a discharge lamp 34 is supported by a pair of read supports *32a* and *32b* protruded forwardly from an insulating base 31. A discharge part *34a* of the discharge lamp 34 is disposed at a first focal position F1 of the elliptic reflector 22. An ultraviolet rays shield glove 50, shaped tubular and covering the discharge lamp 34, is fixedly supported on a glove hold plate 40 in front of the insulating base 31. The glove 50 thus disposed intercepts the detrimental component, or ultraviolet rays, contained in the light emitted from the discharge part *34a*. At a location near the second focal position F2 of the reflector 22 are disposed a shade 25 for making the clear cut, and an ultraviolet-rays cut inner lens 27 fixed to the lens holder 24 by means of a plate spring member 27*a* made of metal. The light reflected by the discharge part 34*a* of the discharge lamp 34 is reflected by the reflector 22, focused at the second focal position F2 of the reflector 22, and collimated and projected forwardly by the projection lens 26. The plate spring member 27*a* is shaped like U, and the ends 27*al* of both the legs of the U are nipped at the portion where the lens holder 24 and the reflector 22 abut each other. The central part 27*a* of the plate spring member is fastened to the shade 25 by means of a screw 27*$a_3$*. A pair of horizontal ribs 24*a* is formed on the inner wall of the lens holder in one piece construction. Pieces 24*b* of silicon rubber are mounted on the ends of the ribs 24*a* closer to the reflector on which pieces 24*b* of silicon rubber are mounted are in contact with the inner lens 27. The inner lens 27 are pressed against the silicon rubber pieces 24*b* and the upper end 25*a* of the shade. The lens holder 24 and the plate spring member 27*a* are made of metal and excellent in heat resisting property.

Figure 2:
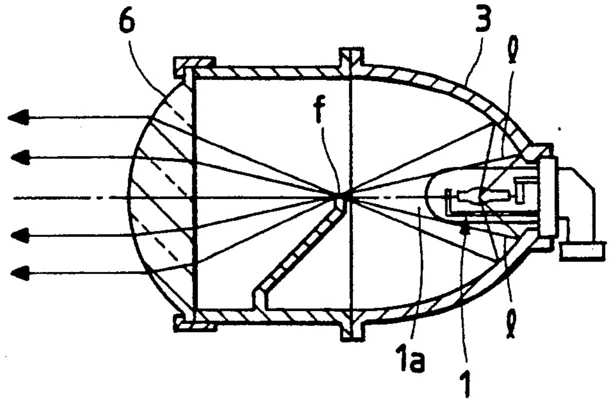
FIG. 2 PRIOR ART
FIG. 2 is a longitudinal sectional view showing a scheme of another conventional vehicular discharge lamp of the projection type, which uses a discharge lamp for a light source.
Figure 3:
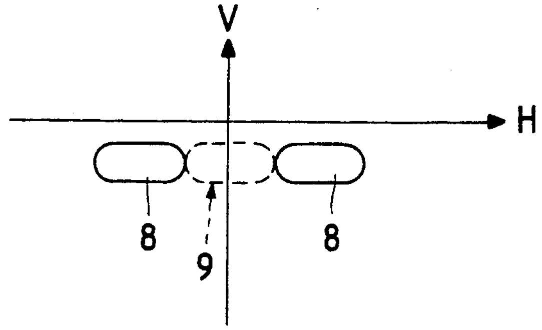
FIG. 3 PRIOR ART
FIG. 3 is a diagram showing a hot zone on a light-distribution screen of the headlamp shown in FIG. 2.
Figure 4:
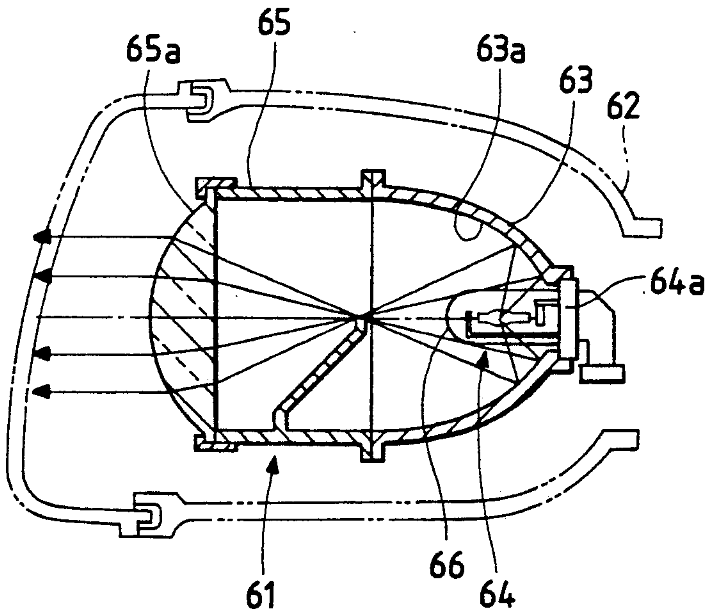
FIG. 4 PRIOR ART
FIG. 4 is a longitudinal sectional view showing a scheme of a conventional vehicular discharge lamp of the projection type.

The fore end 50*a* of the ultraviolet-rays shield glove 50 is disposed at such a location as not to intercept the reflecting light $\lambda_1$ from a reflecting surface 22*a* for hot-zone formation formed around a bulb insertion hole 25 of the reflector 22. In other words, the glove 50 is not positioned on the optical path of the light $\lambda_1$ that is reflected by the reflector 22 and contributes to the light distribution for the hot zone. Accordingly, the light that is reflected by the reflector and contributes to the light distribution for the hot zone is partially intercepted, although it is intercepted in the conventional vehicular headlamp (see FIG. 2). Accordingly, a sufficient amount of light is distributed to the hot zone. The resultant hot zone has a proper size and a sufficient intensity.

The light projected forwardly through the fore open end of the glove, which is shaped tubular, contains ultraviolet rays. However, the ultraviolet rays are filtered out by the inner lens 27 located near the second focal position F2 of the reflector 22. Accordingly, the human body, synthetic resin parts of the lamp, and the like are not exposed to the detrimental ultraviolet rays.

A unit 12 for containing a circuit for lighting on a discharge bulb (not shown) is set to an opening 11 of the rear side of the lamp body 10 through a tubular portion 13. A male connector 14 connected to the lead wire L extended from the light-on circuit is connected to a male connector 15 integrally formed on an insulating base 31. A style strip 16 made of synthetic resin is disposed around the projection lens 26 of the projection unit 20. The surface of the style strip is coated with silver material so as to provide a good appearance when the headlamp is lit off. A lens 18 is assembled into the fore side opening.

Figure 6:
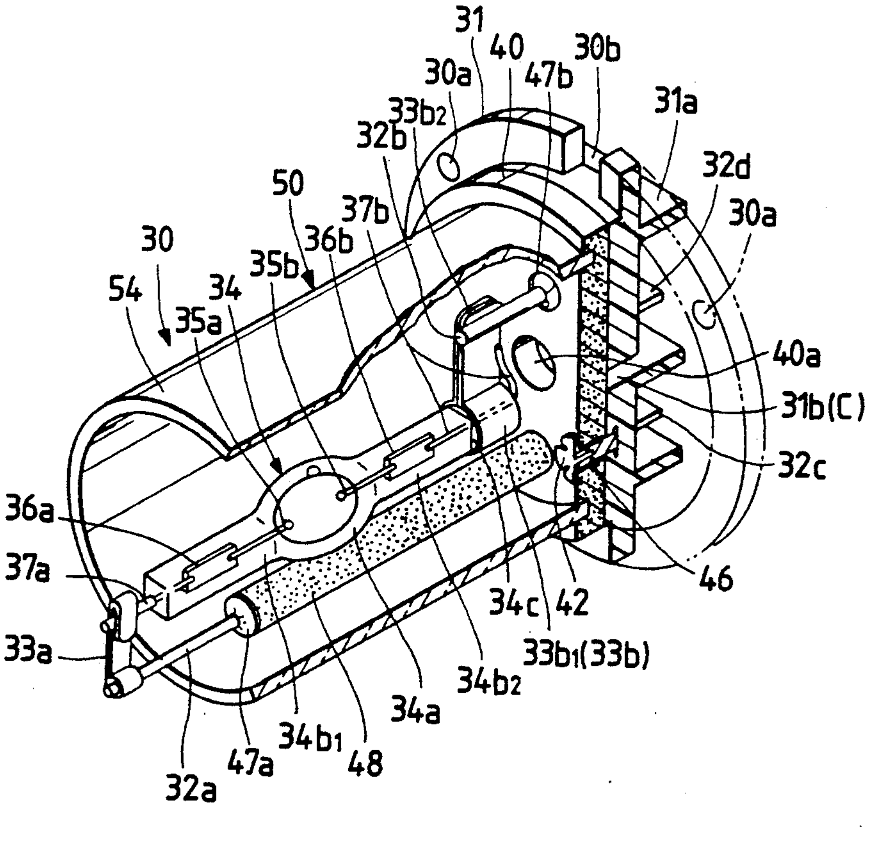
FIG. 6 is a partially broken, perspective view showing a discharge lamp.
Figure 7:
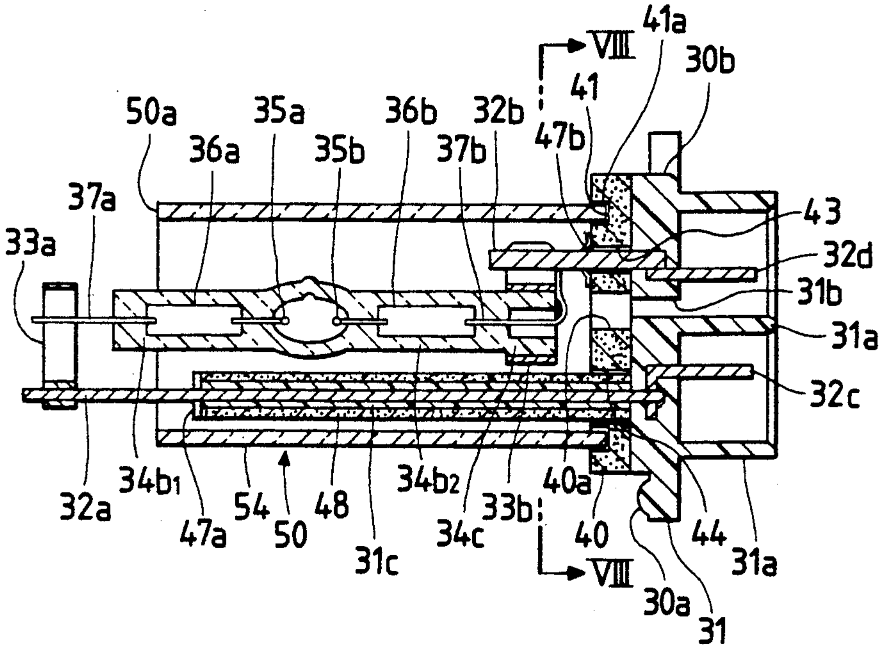
FIG. 7 is a longitudinal sectional view of the discharge lamp.
Figure 8:
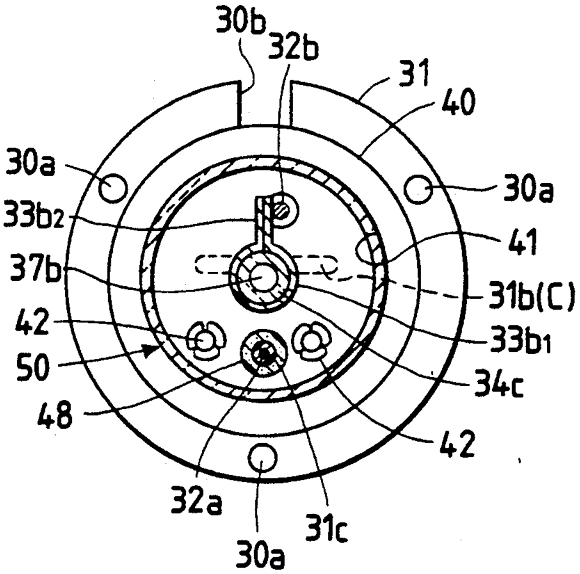
FIG. 8 is a cross sectional view taken on line VIII—VIII in FIG. 7.

Details of the discharge bulb 30 are illustrated in FIGS. 6–8. The discharge lamp 34 is shaped such that a silica glass tube shaped like a pipe circular in cross section is pinched to form an elliptic, closed glass bulb 34*a* as a discharge section located at the central portion, and pinch sealed portions 34*$b_1$* and 34*$b_2$* shaped rectangular in cross section, which are located on both sides of the glass bulb. The glass bulb 34*a* is filled with start rare gas, mercury, and metal halide. An extended part 34*c* shaped line a pipe, not pinch sealed, is informed integral with the pinch sealed portion 34*$b_2$*. The extended part 34*c* is held by a metal support 33*b* to be given later. Within a discharge space is disposed a pair of discharge electrodes 35*a* and 35*b* made of tungsten. The electrodes 35*a* and 35*b* are respectively connected to molybdenum foils 36*a* and 36*b*, which are disposed within the pinched sealed portions 34*$b_1$* and 34*$b_2$*. Lead wires 37*a* and 37*b* connected to the molybdenum foils 36*a* and 36*b* are respectively derived from the ends of the pinch sealed portions 34*$b_1$* and 34*$b_2$*. The lead wire 37*b* is spot welded to the metal support 33*b* through the extended part 34*c*. The discharge lamp 34, insert molded into an insulating base, is supported at both ends by a pair of lead supports 32*a* and 32*b*, which are different in length and extended forwardly as viewed from the base.

The insulating base 31 is a disc like member made of synthetic resin, such as PPS. Connector male terminals 32*c* and 32*d* welded to the lead supports 32*a* and 32*b* are protruded from the rear side of the base 31. Rectangular tubular partition walls 31*a* surround the terminals 32*c* and 32*d*, to prevent discharge from taking place therebetween. One piece member of the terminal 32*c* and the lead support 32*a* and another piece member of the terminal 32*d* and the lead support 32*b* are insert-molded into the insulating base 31. A through-hole 31*b* is formed at an area of the base located between the lead supports 32*a* and 32*b*. The through-hole remarkably increases the dielectric strength of the base 31. The hole 31*b* extends between the terminals 32*c* and 32*d*. An air layer C (smaller in dielectric strength than the base material) in the hole exists between those terminals. From this fact, it seems that the dielectric strength of the base is reduced. In contrast with this, however, the dielectric strength of the base is increased. The reason for this follows. In molding the base 31, the wall in which the hole is to be formed is pressed, by a mold, to increase a density of the base material around the hole. The increase of the dielectric strength owing to the material density around the hole overcomes the decrease of the dielectric strength owing to the air layer C. For this reason, between the terminals 32*c* and 32*d*, the dielectric strength of the base having the hole 31*b* is larger than that of the base not having the hole. Discharge will hardly occur between the terminals. This hole 31*b* communicates with the inside of the glove 50 through a through-hole 40*a* formed in a glove hold plate 40. With the communication, an air flow to and from the glove is activated to facilitate the radiation within the glove 50. On the fore side surface of the base 31, a pair of rivets 42 and 42 as jigs for fixing the glove are formed integral with the base by the insert molding. By means of the rivets 42, the glove hold plate 40, shaped like a disc and made of ceramic, is fixed to the front side of the base. A pair of lead supports holes 43 and 44 are formed in the glove hold plate 40. Further a pair of rivet holes 46 and 46 are formed on both sides of the hole 44. The lead supports 32*a* and 32*b* are protruded through the lead support holes 43 and 44. The peripheral edges of the rivet holes are caulked by the rivets 42.

A fixture as a jig for fixing the hold plate is mounted on the lead supports 32*b*. A discharge preventive, insulating tubular member 48 is fitted around a cover 31*c* of the lead support 32*a*. Another fixture 47*a*, which has the same structure as the fixture 47*b*, is also mounted between the insulating tubular member 48 and the lead support 32*a*. By the fixture, the insulating tubular member 48 is fixed to the lead support 32*a*.

The metal support 33*b* is formed by rolling a strip like metal plate of a fixed width into a pipe like member, circular in cross section, and contains an arcuate lamp holder $33b_1$ and plate-like, flange portion $33b_2$. The extended part 34c of the discharge lamp is inserted into the lamp holder, and the flange portions are stuck together. In this state, the flange parts $33b_2$ are spot welded to the distal end portion of the lead support 32b. With the construction, the discharge lamp 34 is slidable with respect to the holder $33b_1$ in the axial direction (horizontal direction in FIG. 7) and in the circumferential direction (of the tubular holder) as well. Accordingly, the discharge section of the discharge lamp 34 may readily be adjusted in position relative to the reflector 22. The metal support 33a, which supports the fore end portion of the discharge lamp 34, is also formed by rolling a strip like metal plate of a fixed width into a pipe like member, circular in cross section. One end portion of the support 33a is fixed, caulked and spot welded to the distal end of the lead support 33a. The other end portion of the metal support is bent into a U-shape. The forward end of the lead wire 37a is nipped with the U-shaped end portion, and the nipped portion is spot welded.

Figure 1:
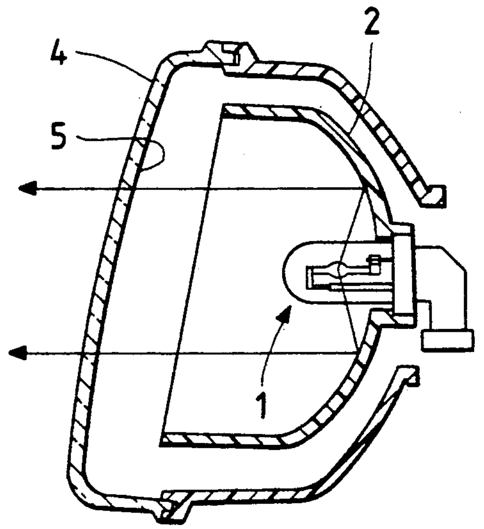
FIG. 1 PRIOR ART
FIG. 1 is a longitudinal sectional view showing a scheme of a conventional vehicular discharge lamp of the projection type.

The ultraviolet-rays shield glove 50, made of glass, is shaped like a tubular cup of which the fore or top end is closed. The glove 50 is fixed to the glove hold plate 40 in such a way that the base part of the glove, which is open, is firmly stuck to a circular groove 41 of the plate 40, with inorganic adhesive 41a. The outer surface of the glove is coated with ultraviolet rays absorbing material, e.g., ZnO, which is to serve as an ultraviolet-rays cut film 54 thereon. In the glove 50 being fixedly supported by the base 31, the ultraviolet-rays cut film 54 covering the discharge lamp 34 absorbs ultraviolet rays generated simultaneously with emission of the discharge lamp 34. Accordingly, only the visible rays not containing the ultraviolet rays are projected outside from the glove 50. The thickness of at least 1.6 μm is required for the film 54 in order that the trasmittivity of the film is 0 for the ultraviolet rays of the wave lengths shorter than 370 nm. The thickness of 5 μm or less is required for ensuring a reliable adhesion of the film. The spectral region of the ultraviolet rays that can be cut depends on temperature around the glove (as temperature rises, the spectral region shifts to the long wave-length side). In this respect, the thickness of the ultraviolet-rays cut film 54 must be selected so that it can cut the ultraviolet rays which fail to reach the range of 370 to 380 nm. The method of coating the glove outer surface with ZnO may be any of dipping, vapor deposition, spray, and the like. If the dipping is used, the film thickness may be controlled by varying the speed of pulling up the glove from the coating material or by changing the number of dippings. The thickness may also be increased by increasing the number of vapor depositions or spays. In the instant embodiment, in forming the ultraviolet-rays cut film 54, it is only needed that the inner and/or outer surfaces of the tubular glass bulb opened at the top end is coated with the ultraviolet-rays absorbing material. Accordingly, the film forming process is remarkably improved when comparing with the film forming process of the already mentioned conventional art (see FIGS. 1 and 2) in which a cup-like glass bulb with the closed top end.

The coating of the inner lens 27 with the ultraviolet rays absorbing material, like that of the glove, is very easy, because the obverse and/or reverse side of a plain glass plate is merely coated with the material, such as ZnO.

Protrusions 30a are provided on the fore side of the circumferential portion of the insulating base 31. The protrusions 30a are for laterally (in the direction of the optical axis) positioning the discharge bulb in a state that the protrusions 30a are in contact with the wall of the bulb insertion hole (not shown).

A cut-out 30b is formed in the circumferential portion of the base 31, and circumferentially positions the discharge bulb in such a way that when the discharge bulb is inserted into a bulb insertion hole, not shown, a protrusion of the discharge bulb engages the cut-out portion 30b.

In the embodiment thus far described, the glove 50, which is fixedly mounted on the base 31, is assembled into the discharge bulb 30 into a one-piece construction. Alternatively, the glove 50 and the discharge bulb 30 are separately provided. The base of the glove is inserted into and fixed to the bulb insertion hole 23.

Figure 9:
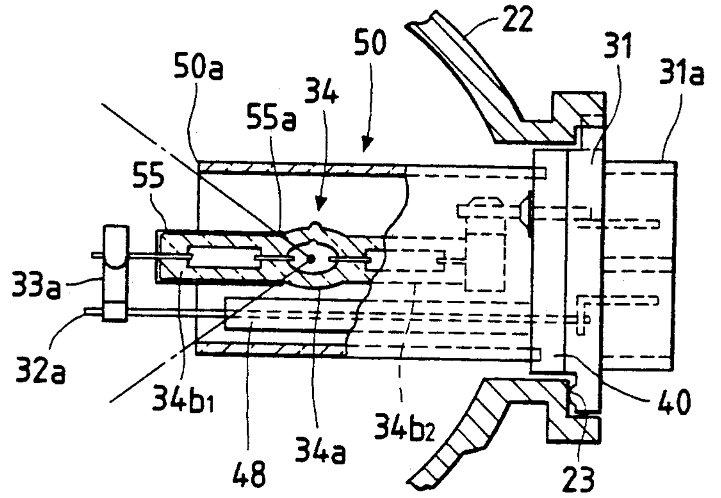
FIG. 9 is a longitudinal sectional view showing a vehicular discharge lamp of the projection type according to the second embodiment of the invention.

In place of the inner lens 27, a film 55 capable of cutting ultraviolet rays, called a black coat, may be applied to the outer circumferential surface of the pinch sealed portion 34b of the discharge lamp 34, as shown in FIG. 9. The film 55 must be terminated at a point 55a on the discharge lamp, which is contained in a line extending from the discharge section 34a to the fore end 50a of the glove.

In the embodiment as mentioned above, the glove 50 and the inner lens 27 are constructed such that the glass surface is coated with ultraviolet rays absorbing material. If required, the glove and the inner lens may be made of soda glass or hard glass capable of absorbing ultraviolet rays.

Figure 10:
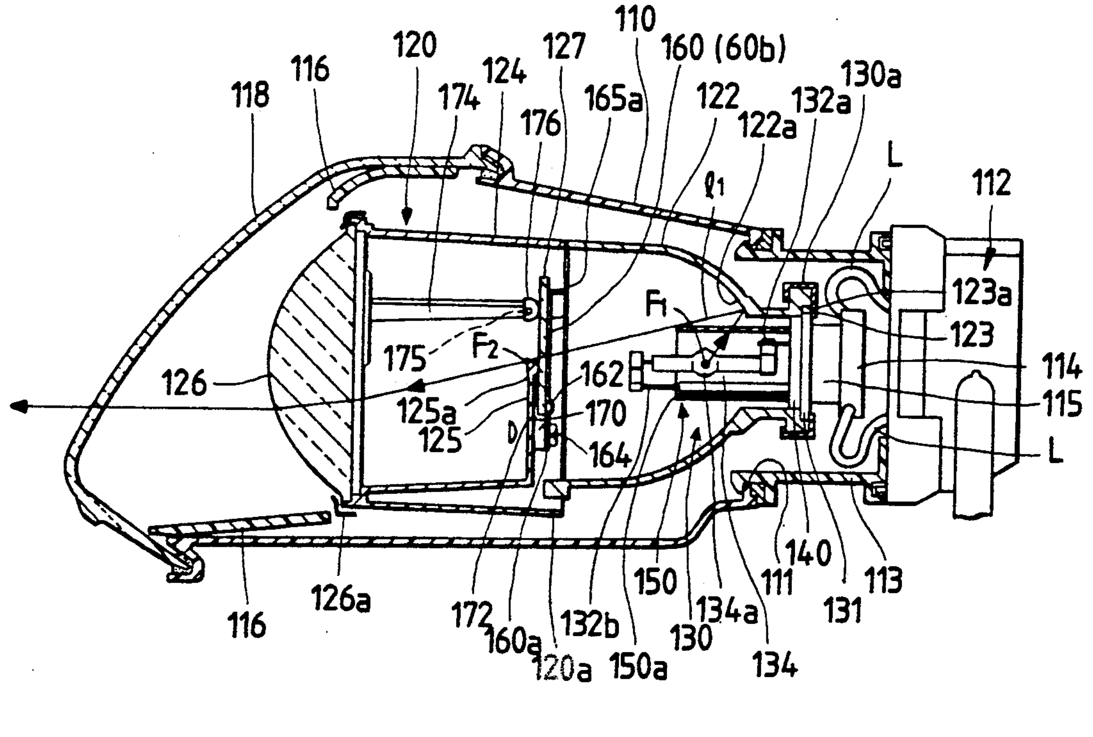
FIG. 10 is longitudinal sectional view showing a vehicular headlamp of the projection type according to a third embodiment of the invention.

FIG. 10 is a longitudinal sectional view showing a projection, vehicular headlamp with a discharge lamp as a light source, which is a third embodiment of the invention.

In the figure, reference numeral 110 designates a lamp body shaped like a container. A projection unit 120 is tiltably supported by means of an aiming mechanism, not shown, within the lamp body 110.

An elliptic reflector 122 made of metal (Al), a discharge bulb 130 inserted in a bulb hole 123 formed in the rear apex of the reflector, and a metal (Al) lens holder 124 fitted in the opening of the fore end of the reflector 122 are assembled into a single unit, or the projection unit 120. Reference numeral 130a designates a locking cap for fixing the discharge bulb 130 to the bulb hole 123, and 126a represents a lens fixing frame, shaped like a ring, for fixing a projection lens 126 to the lens holder 124 in a caulking manner.

Figure 11:
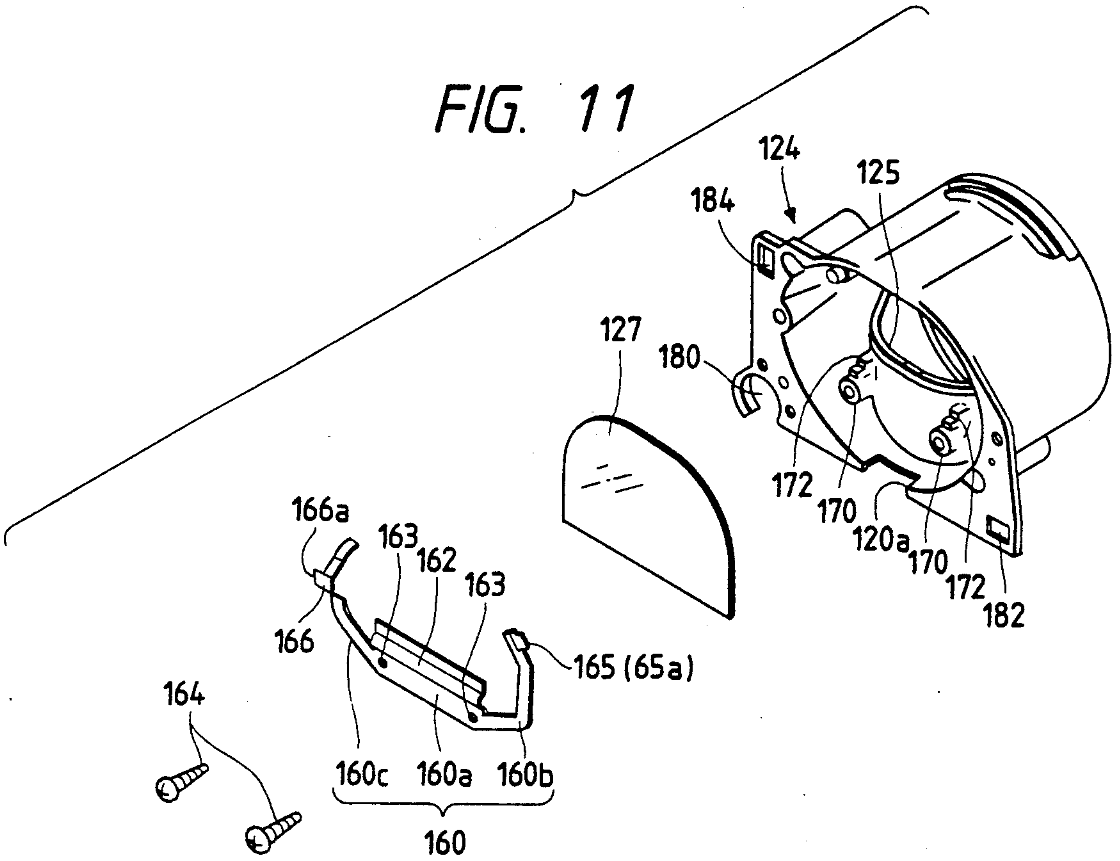
FIG. 11 is an exploded view showing a portion where an ultraviolet-rays cut filter is installed, and its peripheral portion.
Figure 12:
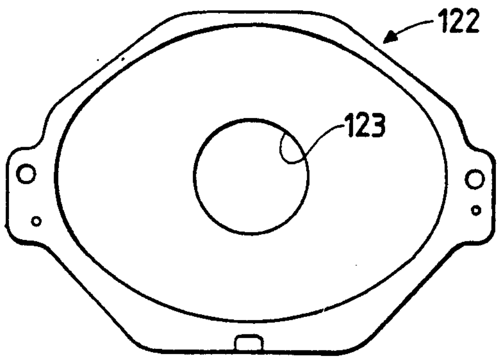
FIG. 12 is a front view showing an elliptic reflector.
Figure 13:
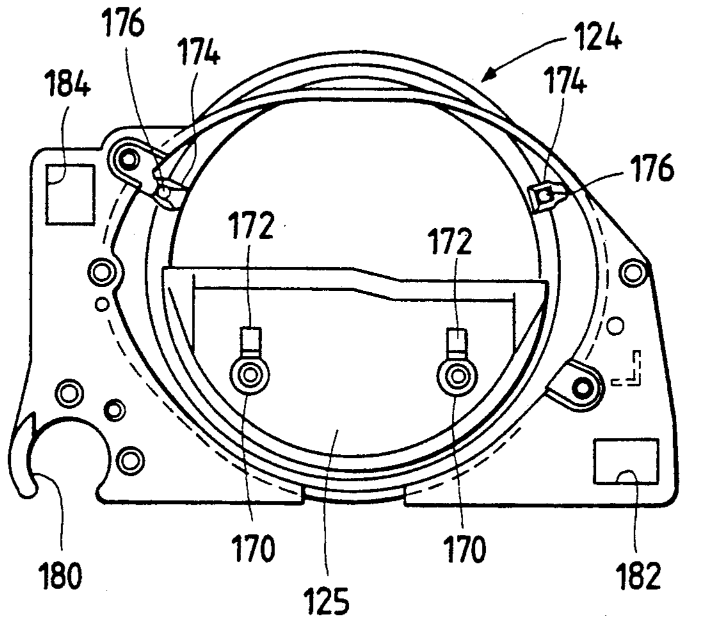
FIG. 13 is a rear view showing a lens holder.
Figure 14:
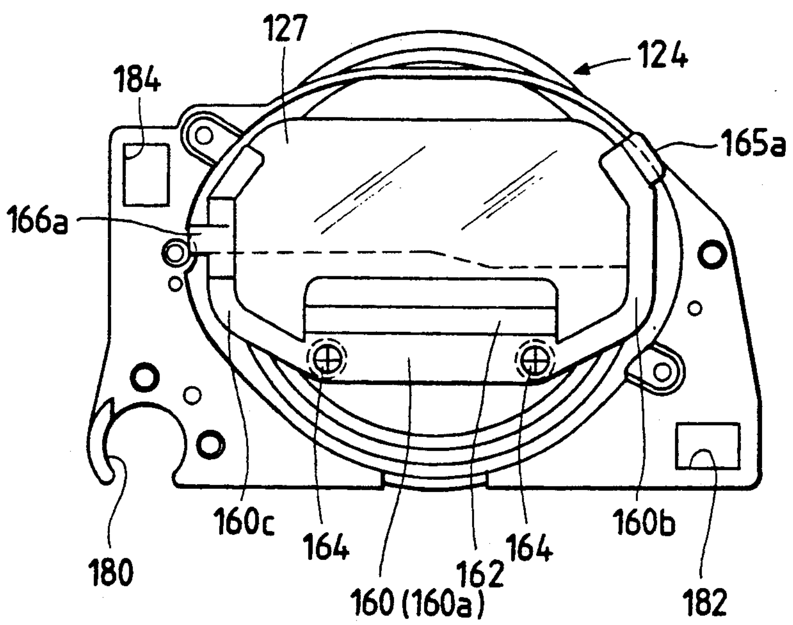
FIG. 14 is a rear view showing the lens holder when the filter is mounted.

In the discharge bulb 130, a discharge lamp 134 is supported by a pair of read supports 132a and 132b protruded forwardly from an insulating base 131. A discharge part 134a of the discharge lamp 134 is disposed at a first focal position F1 of the elliptic reflector 122. An ultraviolet rays shield glove 150, shaped tubular and covering the discharge lamp 134, is fixedly supported on a glove hold plate 140 made of ceramic in front of the insulating base 131. The glove 150 thus disposed intercepts the detrimental component, or ultraviolet rays, contained in the light emitted from the discharge part 134a. At a location near the second focal position F2 of the reflector 122 are disposed a shade 125 for making the clear cut, and an ultraviolet-rays cut filter 127 fixed to the lens holder 124 by means of a plate spring member 160 made of metal. The light reflected by the discharge part 134a of the discharge lamp 134 is reflected by the reflector 122, focused at the second focal position F2 of the reflector 122, and collimated and projected forwardly by the projection lens 126. In this case, the ultraviolet rays are cut two times when passing through the glove 150 and the filter 127. The filter 127 also filters out the ultraviolet rays emitted from the opening of the fore end of the glove 150, not transmitted through the glove. The plate spring member 160, which can be accommodated within the lens holder 124, is shaped as U so as not to hinder the traveling of the reflecting light from the reflecting surface of the reflector as shown in FIGS. 11 and 14. The plate spring member 160 includes an rectangular elongated portion 160*a* in the central portion. The elongated center portion 160*a*, fastened to the shade 125 by means of screws, resiliently supports the bottom edge of the filter 127. Arms 160*b* and 160*c* are upwardly extended from the ends of the elongated portion 160*a*. The tips (165*a* and 166*a*) of the arms are nipped by the lens holder 124 and the reflector 122. The thus constructed arms 160*b* and 160*c* resiliently support the right and left edges of the filter 127. A curved portion 162 for securing the resilient strength is continuous to the elongated center portion 160*a*. Threaded holes 163 receive screws 164, respectively. A bent portion 160, which is bent shaped L in cross section and has a protrusion 165*a* is formed at the tip of the arm 165*b*. A bent portion 166, which is shaped like a trapezoid in cross section and has a protrusion 166*a*, is formed at the center portion of the arm 160*c*. The locations of those protrusions 165*a* and 66*a* correspond to those where the arms are nipped by the lens holder 124 and the reflector 122. A boss 170 is protruded on the rear side of the shade 125 in the lens holder 124 as shown in FIGS. 10, 11 and 13. A protrusion 172 is formed on the upper side of the boss 170. The bottom edge of the filter 127 rests on the protrusion 172 to be vertically positioned. Horizontal ribs 174 and 174 are provided at the upper right and left locations within the lens holder 124. Bosses 175 for supporting the filter 127 (see FIG. 10) are protruded from the faces of the ribs 174 and 174, which are closer to the reflector. Rubber caps 176 are mounted on the bosses 175, respectively. The rubber caps 176 are in contact with the filter 127 to absorb a vibration of the filter. The filter 127 is resiliently supported in a state that the fore side of the filter is pressed against the shade 125, and the rubber caps 176 and 176 by means of the plate spring member 160. The space within the projection unit 120 is heated by heat generated by the discharge bulb 134, so that the space becomes high in temperature. Under this condition, a thermal expansion coefficient between the shade 125 integral with the Al lens holder 124 and the ultraviolet-rays cut filter 127 will cause a thermal stress therein. The spring member absorbs a difference of the thermal deformations of the shade 125 and the filter 127, to suppress the thermal stress which will generate in the shade and the filter 127. An opening 120*a* (see FIG. 11) is formed in the edge of the opening of the lens holder 124, located closer to the reflector. The inside of the projection unit 120 communicates with the outside of the unit. Air flow takes place between the inside and the outside of the projection unit, facilitating radiation of heat. To nip parts of 165*a* and 166*a* of the spring member 160 by the lens holder 124 and the reflector 22, a gap substantially equal to the thickness of the spring member 160 is formed in the laminated surface of the lens holder 124 and the reflector 122. This gap also contributes to the promotion of heat radiation within the projection unit 120. In FIGS. 11, 13, and 14, reference numeral 180 designates a portion for receiving a fulcrum of the ball joint type. Numerals 182 and 184 indicate holes for receiving nuts to engage a horizontal (vertical) aiming screw (not shown), which is supported by the lamp body and horizontally extends.

The fore end 150*a* of the ultraviolet-rays shield glove 150 is disposed at such a location as not to intercept the reflecting light $\lambda_1$ from a reflecting surface 122*a* for hot-zone formation formed around a bulb insertion hole 123 of the reflector 122. In other words, the glove 150 is not positioned on the optical path of the light $\lambda_1$ that is reflected by the reflector 122 and contributes to the light distribution for the hot zone. Accordingly, the light that is reflected by the reflector and contributes to the light distribution for the hot zone is partially intercepted, although it is intercepted in the conventional vehicular headlamp. Accordingly, a sufficient amount of light is distributed to the hot zone. The resultant hot zone has a proper size and a sufficient intensity.

The light projected forwardly through the fore open end of the glove, which is shaped tubular, contains ultraviolet rays. However, the ultraviolet rays are filtered out by the filter 127 located near the second focal position F2 of the reflector 122. Accordingly, the human body, synthetic resin parts of the lamp, and the like are not exposed to the detrimental ultraviolet rays.

A unit 112 for containing a circuit for lighting on a discharge bulb (not shown) is set to an opening 111 of the rear side of the lamp body 10 through a tubular portion 113. A male connector 114 connected to the lead wire L extended from the light-on circuit is connected to a male connector 115 integrally formed on an insulating base 131. A style strip 116 made of synthetic resin is disposed around the projection lens 126 of the projection unit 120. The surface of the style strip is coated with silver material so as to provide a good appearance when the headlamp is lit off. A lens 118 is assembled into the fore side opening.

Figure 15:
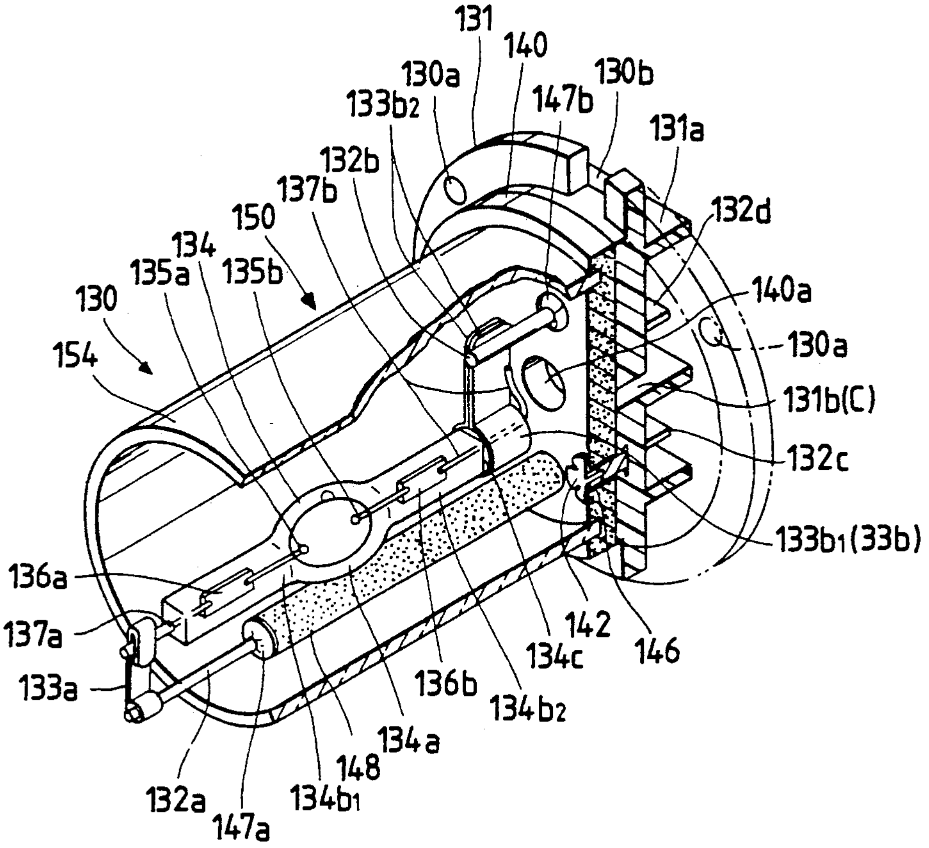
FIG. 15 is a partially broken, perspective view showing a discharge lamp.
Figure 16:
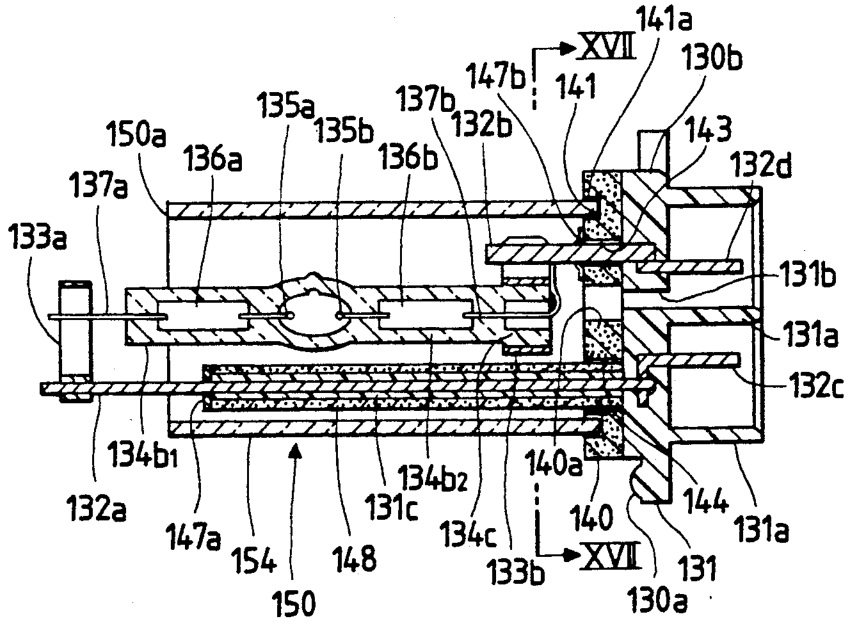
FIG. 16 is a longitudinal sectional view of the discharge lamp.
Figure 17:
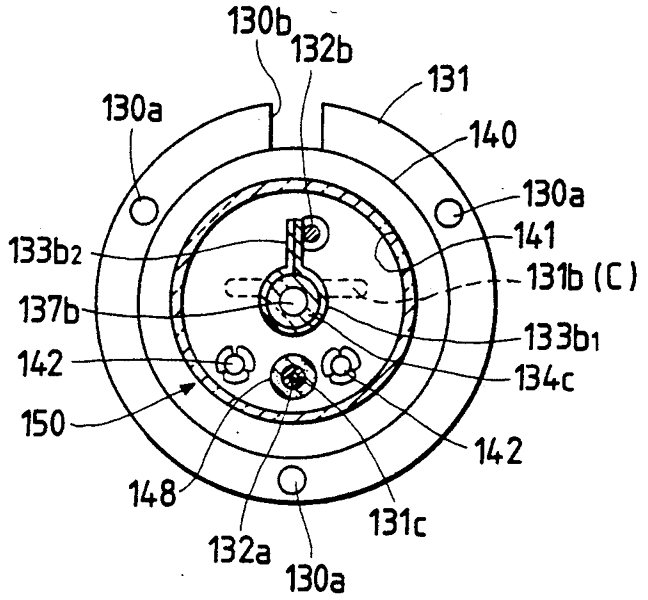
FIG. 17 is a cross sectional view taken on line XVII—XVII in FIG. 16.

Details of the discharge bulb 130 are illustrated in FIGS. 15–17. The discharge lamp 134 is shaped such that a silica glass tube shaped like a pipe circular in cross section is pinched to form an elliptic, closed glass bulb 134*a* as a discharge section located at the central portion, and pinch sealed portions 134*b*₁ and 134*b*₂ shaped rectangular in cross section, which are located on both sides of the glass bulb. The glass bulb 134*a* is filled with start rare gas, mercury, and metal halide. An extended part 134*c* shaped line a pipe, not pinch sealed, is informed integral with the pinch sealed portion 134*b*₂. The extended part 134*c* is held by a metal support 133*b* to be given later. Within a discharge space is disposed a pair of discharge electrodes 135*a* and 135*b* made of tungsten. The electrodes 135*a* and 135*b* are respectively connected to molybdenum foils 136*a* and 136*b*, which are disposed within the pinched sealed portions 134*b*₁ and 134*b*₂. Lead wires 137*a* and 137*b* connected to the molybdenum foils 136*a* and 136*b* are respectively derived from the ends of the pinch sealed portions 134*b*₁ and 134*b*₂. The lead wire 137*b* is spot welded to the metal support 133*b* through the extended part 134*c*. The discharge lamp 134, insert molded into an insulating base, is supported at both ends by a pair of lead supports 132*a* and 132*b*, which are different in length and extended forwardly as viewed from the base.

The insulating base 131 is a disc like member made of synthetic resin, such as PPS. Connector male terminals 132*c* and 132*d* welded to the lead supports 132*a* and 132*b* are protruded from the rear side of the base 131.

Rectangular tubular partition walls 131*a* surround the terminals 132*c* and 132*d*, to prevent discharge from taking place therebetween. One piece member of the terminal 132*c* and the lead support 132*a* and another piece member of the terminal 132*d* and the lead support 132*b* are insert-molded into the insulating base 131. A through-hole 131*b* is formed at an area of the base located between the lead supports 132*a* and 132*b*. The through-hole remarkably increases the dielectric strength of the base 131. The hole 131*b* extends between the terminals 132*c* and 132*d*. An air layer C (smaller in dielectric strength than the base material) in the hole exists between those terminals. From this fact, it seems that the dielectric strength of the base is reduced. In contrast with this, however, the dielectric strength of the base is increased. The reason for this follows. In molding the base 131, the wall in which the hole is to be formed is pressed, by a mold, to increase a density of the base material around the hole. The increase of the dielectric strength owing to the material density around the hole overcomes the decrease of the dielectric strength owing to the air layer C. For this reason, between the terminals 132*c* and 132*d*, the dielectric strength of the base having the hole 131*b* is larger than that of the base not having the hole. Discharge will hardly occur between the terminals. This hole 131*b* communicates with the inside of the glove 150 through a through-hole 140*a* formed in a glove hold plate 140. With the communication, an air flow to and from the glove is activated to facilitate the radiation within the glove 150.

On the fore side surface of the base 131, a pair of rivets 142 and 142 as jigs for fixing the glove are formed integral with the base by the insert molding. By means of the rivets 142, the glove hold plate 140, shaped like a disc and made of ceramic, is fixed to the front side of the base. A pair of lead supports holes 143 and 144 are formed in the glove hold plate 140. Further a pair of rivet holes 146 and 146 are formed on both sides of the hole 144. The lead supports 132*a* and 132*b* are protruded through the lead support holes 143 and 144. The peripheral edges of the rivet holes are caulked by the rivets 142.

A fixture as a jig for fixing the hold plate is mounted on the lead supports 132*b*. A discharge preventive, insulating tubular member 148 is fitted around a cover 131*c* of the lead support 132*a*. Another fixture 147*a*, which has the same structure as the fixture 147*b*, is also mounted between the insulating tubular member 148 and the lead support 132*a*. By the fixture, the insulating tubular member 148 is fixed to the lead support 132*a*.

The metal support 133*b* is formed by rolling a strip like metal plate of a fixed width into a pipe like member, circular in cross section, and contains an arcuate lamp holder 133*b*$_1$ and plate-like, flange portions 133*b*$_2$. The extended part 134*c* of the discharge lamp is inserted into the lamp holder, and the flange portions are stuck together. In this state, the flange parts 133*b*$_2$ are spot welded to the distal end portion of the lead support 132*b*. With the construction, the discharge lamp 134 is slidable with respect to the holder 133*b*$_1$ in the axial direction (horizontal direction in FIG. 16) and in the circumferential direction (of the tubular holder) as well. Accordingly, the discharge section of the discharge lamp 134 may readily be adjusted in position relative to the reflector 122. The metal support 133*a*, which supports the fore end portion of the discharge lamp 134, is also formed by rolling a strip like metal plate of a fixed width into a pipe like member, circular in cross section. One end portion of the support 133*a* is fixed, caulked and spot welded to the distal end of the lead support 133*a*. The other end portion of the metal support is bent into a U-shape. The forward end of the lead wire 137*a* is nipped with the U-shaped end portion, and the nipped portion is spot welded.

The ultraviolet-rays shield glove 150, made of glass, is shaped like a tubular cup of which the fore or top end is closed. The glove 150 is fixed to the glove hold plate 140 in such a way that the base part of the glove, which is open, is firmly stuck to a circular groove 141 of the plate 140, with inorganic adhesive 141*a*. The outer surface of the glove is coated with ultraviolet rays absorbing material, e.g., ZnO, which is to serve as an ultraviolet-rays shield film 154 thereon. In the glove 150 being fixedly supported by the base 131, the ultraviolet-rays shield film 154 covering the discharge lamp 134 absorbs ultraviolet rays generated simultaneously with emission of the discharge lamp 134. Accordingly, only the visible rays not containing the ultraviolet rays are projected outside from the glove 150. The thickness of at least 1.6 μm is required for the film 154 in order that the trasmittivity of the film is 0 for the ultraviolet rays of the wave lengths shorter than 370 nm. The thickness of 5 μm or less is required for ensuring a reliable adhesion of the film. The spectral region of the ultraviolet rays that can be cut depends on temperature around the glove (as temperature rises, the spectral region shifts to the long wave-length side). In this respect, the thickness of the ultraviolet-rays shield film 154 must be selected so that it can cut the ultraviolet rays which fail to reach the range of 370 to 380 nm. The method of coating the glove outer surface with ZnO may be any of dipping, vapor deposition, spray, and the like. If the dipping is used, the film thickness may be controlled by varying the speed of pulling up the glove from the coating material or by changing the number of dippings. The thickness may also be increased by increasing the number of vapor depositions or spays. In the instant embodiment, in forming the ultraviolet-rays shield film 154, it is only needed that the inner and/or outer surfaces of the tubular glass bulb opened at the top end is coated with the ultraviolet-rays absorbing material. Accordingly, the film forming process is remarkably improved when comparing with the film forming process of the already mentioned proposal (see FIG. 10) in which a cup-like glass bulb with the closed top end.

The coating of the filter 127 with the ultraviolet rays absorbing material, like that of the glove, is very easy, because the obverse and/or reverse side of a plain glass plate is merely coated with the material, such as ZnO.

Protrusions 130*a* are provided on the fore side of the circumferential portion of the insulating base 131. The protrusions 130*a* are for laterally (in the direction of the optical axis) positioning the discharge bulb in a state that the protrusions 130*a* are in contact with the wall of the bulb insertion hole, not shown.

A cut-out 130*b* is formed in the circumferential portion of the base 131, and circumferentially positions the discharge bulb in such a way that when the discharge bulb is inserted into a bulb insertion hole, not shown, a protrusion of the discharge bulb engages the cut-out portion 30*b*.

Figure 18:
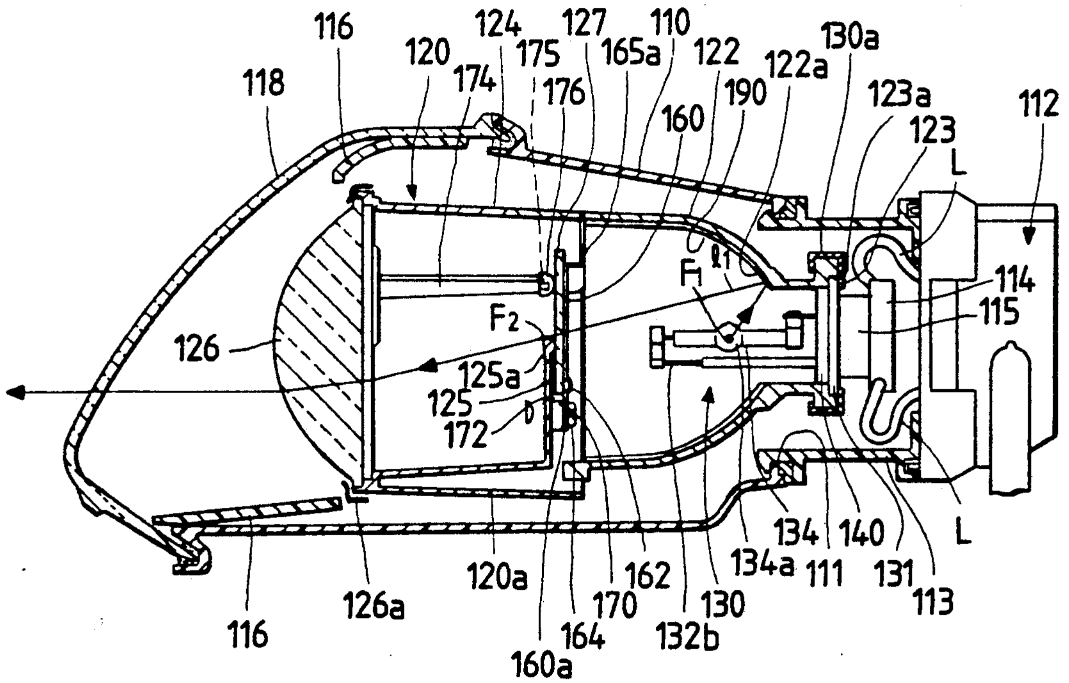
FIG. 18 is longitudinal sectional view showing a vehicular headlamp of the projection type according to a fourth embodiment of the invention.

FIG. 18 is a longitudinal sectional view showing a projection, vehicular headlamp with a discharge lamp as a light source, which is a fourth embodiment of the invention.

The fourth embodiment is different from the third embodiment in that the ultraviolet-rays shield glove is not disposed around the discharge lamp 134. When light emitted from the discharge lamp 134 is reflected by the reflecting surface of the reflector 122, and travels toward the projection lens 126, the ultraviolet rays are cut by the filter 127. The reflector is protected against the ultraviolet rays with a ultraviolet-rays protecting film 190 made of ZnO, for example layered on the reflecting surface of the reflector 122. The remaining construction of the fourth embodiment is substantially the same as that of the third embodiment. Accordingly, description on the remaining construction will be omitted here, and for simplicity like reference symbols are used for designating like or equivalent portions in the figures used for explaining the first embodiment.

As seen from the foregoing description, in the vehicular headlamp of the projection type, the light reflected by the reflecting surface of the reflector, which is for light distribution to the hot zone, is not intercepted by the ultraviolet-rays shield glove. Accordingly, the hot zone obtained has a proper size and a sufficient intensity. The ultraviolet rays emitted through the opening of the fore end of the glove, are cut by the inner lens or the ultraviolet rays are cut by the ultraviolet-rays cut film formed on the discharge lamp are cut when they emits through the opening of the fore end of the discharge lamp. The ultraviolet rays will not hit the human body and the headlamp parts.

Further, a thermal stress generated between the filter and the reflector is absorbed by the metal plate spring member, which fixedly supports the filter. No thermal stress will destroy the filter.

In the headlamp according to the invention, the ultraviolet rays contained in the light emitted from the discharge lamp are removed two times by the glove and the filter when the light passes through them. The ultraviolet rays emitted through the opening of the fore end of the glove are filtered out by the filter. The light emitted from the headlamp is not harmful to the human body. The fore end of the glove is opened outside. This opening improves the heat radiation within the glove, elongating the lifetime of the discharge lamp.

In the headlamp of another aspect of the invention, the ultraviolet rays that are directed directly from the discharge lamp toward the projection lens or directed toward the lens after reflected by the reflector, are filtered out by the ultraviolet-rays cut filter. The ultraviolet rays emitted through the opening of the fore end of the glove are filtered out by the filter.

Since the glove covering the discharge lamp is not used, the required number of parts is reduced. The discharge lamp is installed within the reflector, not covered by the glove. No high temperature will reduce the lifetime of the discharge lamp.

Since the glove is not used, the elliptic reflector is directly exposed to the ultraviolet rays. However, the protecting film layered on the reflecting surface protects the reflector against the ultraviolet rays. No ultraviolet rays degenerate the lamp parts.

What is claimed is:

1. A vehicular headlamp of the projection type in which a projection unit is installed within a lamp body, the projection unit including an elliptic reflector, a discharge lamp as a light source disposed at a first focal position of the elliptic reflector, an ultraviolet-rays shield and light permeable glove for covering the discharge lamp, and a projection lens disposed at a forward location of the elliptic reflector, the projection lens collimating and projecting forward the light reflected from the elliptic reflector, wherein the ultraviolet-ray shield glove is a tubular member which is opened at the fore end and said projection unit includes an inner lens, disposed between the discharge lamp and the projection lens, for intercepting the ultraviolet rays.

2. A vehicular headlamp of the projection type in which a projection unit is installed within a lamp body, the projection unit including an elliptic reflector, a discharge lamp as a light source disposed at a first focal position of the elliptic reflector, an ultraviolet-rays shield and light permeable glove for covering the discharge lamp, and a projection lens disposed at a forward location of the elliptic reflector, the projection lens collimating and projecting forward the rays of reflecting light from the elliptic reflector, wherein the ultraviolet-ray shield glove is a tubular member, which is opened at the fore end, and at least a part of the outer surface of the discharge lamp where faces the open end of the glove is covered with an ultraviolet-rays cut film.

3. A vehicular headlamp of the projection type in which a projection unit is installed within a lamp body, the projection unit including an elliptic reflector, a discharge lamp as a light source disposed at a first focal position of the elliptic reflector, and a projection lens disposed at a forward location of the elliptic reflector, the projection lens collimating and projecting forward the light reflected from the elliptic reflector, wherein an ultraviolet-rays shield and light permeable glove is provided, which is a tubular member which is opened at the fore end, and an ultraviolet-rays shield filter, fixedly supported by a metal plate spring, is disposed between the discharge lamp and the projection lens, for intercepting the ultraviolet rays.

4. A vehicular headlamp of the projection type in which a projection unit is installed within a lamp body, the projection unit including an elliptic reflector, a discharge lamp as a light source disposed at a first focal position of the elliptic reflector, and a projection lens disposed at a forward location of the elliptic reflector, the projection lens collimating and projecting forward the rays of reflecting light from the elliptic reflector, wherein an ultraviolet rays protecting film is formed on the reflecting surface of the elliptic reflector, and an ultraviolet-rays shield filter, fixedly supported by a metal plate spring, is disposed between the discharge lamp and the projection lens, for intercepting the ultraviolet rays.

* * * * *